United States Patent
Ogata et al.

[11] Patent Number: 6,097,547
[45] Date of Patent: Aug. 1, 2000

[54] FRONT CONVERTER LENS SYSTEM USING A DIFFRACTIVE SURFACE

[75] Inventors: Yasuji Ogata, Akiruno; Yuji Kamo, Hino, both of Japan

[73] Assignee: Olympus Optical Co., Ltd., Tokyo, Japan

[21] Appl. No.: 09/159,221

[22] Filed: Sep. 23, 1998

[30] Foreign Application Priority Data

Oct. 17, 1997 [JP] Japan .................................. 9-285277

[51] Int. Cl.[7] .................................................. G02B 15/02
[52] U.S. Cl. ........................................ 359/673; 359/558
[58] Field of Search .................................... 359/672, 673, 359/674, 558, 563–566, 569–571, 676, 683, 686, 689, 691, 745–756, 763, 771, 784, 793

[56] References Cited

U.S. PATENT DOCUMENTS

| | | | |
|---|---|---|---|
| 5,528,416 | 6/1996 | Hartmann | 359/673 |
| 5,543,966 | 8/1996 | Meyers | 359/565 |
| 5,548,439 | 8/1996 | Smith | 359/566 |
| 5,748,372 | 5/1998 | Kitagawa | 359/565 |
| 5,838,497 | 11/1998 | Maruyama | 359/565 |

FOREIGN PATENT DOCUMENTS

| | | |
|---|---|---|
| 4-116511 | 4/1992 | Japan . |
| 6-289289 | 10/1994 | Japan . |

OTHER PUBLICATIONS

Applied Optics/vol. 27, No. 14/Jul. 15, 1988 Hybrid Diffractive–Refractive Lenses and Achromats, T.Stone et al,pp. 2960–2971.

SPIE vol. 2689 "Diffractive Optics at Eastman Kodak Company"to M.K. Meyers, pp. 228–254 Aug., 1996.

*Primary Examiner*—Georgia Epps
*Assistant Examiner*—Jordan M. Schwartz
*Attorney, Agent, or Firm*—Pilsbury Madison & Sutro LLP

[57] ABSTRACT

The invention provides an inexpensive yet lightweight front converter lens system which is improved in terms of performance by use of a diffractive surface. A front converter lens system CL mounted on a subject-side of a master lens system ML to convert its focal length comprises at least two lens groups, each comprising a diffractive surface $r_1$ or $r_2$.

15 Claims, 9 Drawing Sheets

FRONT CONVERTER LENS SYSTEM USING A DIFFRACTIVE SURFACE

BACKGROUND OF THE INVENTION

The present invention relates generally to a front converter lens system using a diffractive surface having a lens action based on a diffraction phenomenon, and more specifically to an optical system which is mounted on a subject-side of a master lens system to vary its focal length.

Conventionally, an optical system has been used with a master lens system (generally a phototaking lens) to make its focal length long or short. To make the focal length long, a substantially a focal arrangement of a positive lens and a negative lens is often used. To make the focal length short, a substantially a focal arrangement of a negative lens and positive lens is often used. These arrangements are generally called an afocal front converter lens system, which is very convenient because the focal length of a camera lens, for instance, can be varied by mere attachment of that optical system thereto.

However, currently available a focal front converter lens systems fail to take full advantage of their convenience because they are made up of some glass lenses in order to achieve satisfactory correction for aberrations and, hence, incur weight and cost increases.

A typical afocal front converter lens system is disclosed in JP-A 6-289289. Example 4 therein is directed to an optical system comprising a lens group of positive power located on a subject side thereof and a lens group of negative power located on an image side thereof, each consisting of a doublet, and having a zoom ratio of 1.3. Each lens group is corrected for chromatic aberrations and all lenses are constructed of glass material; satisfactory image quality is obtained with a corrected Petzval sum. On the other hand, Example 1 therein shows an optical system comprising two lens groups, each consisting of one plastic lens. However, this example uses a special material having extremely low dispersion instead of an ordinarily available plastic material (such as acrylic resin or polycarbonate resin) because, with the latter plastic material, it is difficult to make sufficient correction for chromatic aberrations.

JP-A 4-116511 discloses a wide converter lens system having a zoom ratio of 0.8, with a first lens group of negative power located on a subject side thereof and a second lens group of positive power located on an image side thereof, said first lens group consisting of two glass lenses and said second lens group consisting of one glass lens.

It is not preferable to use glass lenses for these prior systems because of cost and weight increases. Weight problems may be solved by use of plastic lenses, from productivity and cost perspectives, however, this is again not preferable because of the need of some special material. Further, any sufficient performance is not achieved by use of ordinarily available resin materials.

An object of the present invention as will hereinafter be explained is to use a diffractive surface, thereby providing an inexpensive yet lightweight converter lens system having improved performance.

For a better understanding of the invention, the lens action of a diffractive surface is here explained. While a conventional lens is based on the refraction of light at a medium interface, the lens action of the diffractive surface is based on the diffraction of light. Now consider the incidence of light on such a diffraction grating as shown in generally in FIG. 1. Emergent light upon diffraction satisfies the following equation (a):

$$\sin \theta - \sin \theta' = m\lambda/d \quad (a)$$

where $\theta$ is the angle of incidence, $\theta'$ is the exit angle, $\lambda$ is the wavelength of light, d is the pitch of the diffraction grating, and m is the order of diffraction.

Consequently, if the pitch of a ring form of diffraction grating is properly determined according to equation (a), it is then possible to converge the incident light on one point, i.e., impart a lens action to the diffraction grating. Here let $r_j$ and f the radius of a j-th ring on the grating and the focal length of the diffractive surface, respectively. Then, the following equation (b) is satisfied in a region of first approximation:

$$r_j^2 = 2\lambda f \quad (b)$$

For a diffraction grating, on the other hand, a bright-and-dark ring form of amplitude-modulated type grating, and a phase-modulated type grating with a variable refractive index or optical path length are known. In the amplitude-modulated type, for instance, the diffraction efficiency the ratio between the quantity of incident light and the quantity of the first order diffracted light) is about 6% at most because plural orders of diffracted light are produced. In the phase-modulated type, too, the diffraction efficiency is about 34% at most. If the diffraction grating is modified such that its section is of such saw-toothed shape as depicted in FIG. 2, however, the diffraction efficiency can theoretically be brought up to 100%. Even though actual losses are taken into account, a diffraction efficiency of at least 95% is then obtainable. Such a diffraction grating is called a kinoform. In this case, the height of each tooth is given by $$h = m\lambda/(n-1) \quad (c)$$

where h is the height of the tooth, and n is the index of refraction of a substrate material forming the diffractive surface.

As can be predicted from equation (c), a diffraction efficiency of 100% is achievable at only one wavelength. FIG. 3 illustrates a specific wavelength vs. diffraction efficiency relation at 550 nm design wavelength. As the wavelength deviates from the design wavelength, the diffraction efficiency decreases greatly. With decreasing diffraction efficiency, the remnant light exists as unnecessary light. In the case of an optical system used under white light, care should thus be taken of a flare problem due to such unnecessary light.

How to design a diffractive surface is now explained. The diffractive surface may be designed by some known methods. In practicing the present invention, however, it is preferable to make use of an ultra-high index method, according to which the diffractive surface is known to be equivalent to a refractive surface having a very high refractive index at null thickness. At this time, the index of refraction $n(\lambda)$ at any wavelength is given by $$n(\lambda) = 1 + \{n(\lambda_0) - 1\}\lambda/\lambda_0 \quad (d)$$

where $\lambda$ is an arbitrary wavelength, $\lambda_0$ is a reference wavelength, and $n(\lambda_0)$ is the index of refraction at wavelength $\lambda$.

The diffractive surface has two important features when used in the form of a lens. The first feature is an aspherical action. If the pitch of a diffraction grating is properly determined as already stated, it is then possible to converge light on one point. The second feature is that dispersion is very large or, in another parlance, a so-called Abbe's number is found to be −3.45 from equation (d). Chromatic aberrations several times as large as those of a conventional glass material are produced with a minus sign or in the opposite direction. It is also found that strong anomalous dispersion is obtained with a low partial dispersion ratio.

An example of applying such a diffractive surface to optical systems used under natural light is known from an article "Hybrid diffractive-refractive lenses and achromats", Appl. Opt. 27, pp. 2960–2971. This prior publication shows an example of calculation in the case where, based on the principle of correction of paraxial chromatic aberration, the diffractive surface is used in combination with a single glass lens to make correction for longitudinal chromatic aberration. Specifically, the publication shows that the plane side of a plano-convex lens is constructed of a diffractive surface to provide an achromatic condition, and refers to remnant secondary spectra. The publication also shows achromatization by use of a diffractive surface and doublet combination.

U.S. Pat. No. 5,543,966 shows an example of achromatization by use of a singlet and diffractive surface combination. This example is applied to a so-called film camera for the purpose of increasing the performance of a phototaking optical system comprising a positive meniscus lens convex on a subject side thereof and a stop by disposing a diffractive surface on an image-side surface of the lens, thereby making correction for chromatic aberrations.

"Diffractive optics at Eastman Kodak Company", SPIE, Vol. 2689, pp. 228–254 shows applications of diffractive surfaces to a variety of optical systems. In particular, the publication shows applications of the diffractive surface to phototaking zoom lens systems for lens shutter cameras, and to inversed Galilean type finder systems.

SUMMARY OF THE INVENTION

With such problems with the prior art in mind, an object of the present invention is to provide an inexpensive yet lightweight front converter lens system mounted on a subject-side of a master lens system to vary a focal length of said master lens system, said front converter lens system being improved in terms of performance by use of a diffractive surface. A particular object of the invention is to provide a converter lens system using a resinous material.

These objects of the invention are achievable by the provision of a front converter lens system using a diffractive surface. The front converter lens system of the invention is mounted on a side of a master lens system facing a subject side thereof to convert a focal length thereof, and is characterized by comprising at least two lens groups, each having a diffractive surface therein.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is illustrative of an unpreferred embodiment of a system comprising one lens group having a diffractive surface therein and another lens group having a refractive doublet therein.

FIG. 6(a) shows an amplitude-modulated diffractive surface.

FIG. 6(b) shows a diffractive surface having high and low refractive index portions.

FIG. 6(c) shows a diffractive surface having an alternate arrangement of rectangular apertures.

FIG. 6(d) shows a diffractive surface having a kinoform arrangement.

FIG. 6(e) shows a diffractive surface having binary elements to a four-level approximation.

FIG. 6(f) shows a diffractive surface having binary elements to a eight-level approximation.

FIG. 7 is illustrative of a section of a first master lens system on which the front converter lens system of the invention is to be mounted.

FIG. 12(a) shows the lens system in a wide-angle configuration.

FIG. 12(b) shows the lens system in an intermediate configuration.

FIG. 12(c) shows the lens system in a telephoto configuration.

DESCRIPTION OF THE PREFERRED EMBODIMENTS

Prior to explaining the examples of the invention, the benefits and operation of the invention are explained.

An afocal converter lens system is generally made up of a positive lens group and a negative lens group. An a focal converter lens wherein a positive lens group and a negative lens group are disposed in order from a subject side thereof is called a tele-converter lens, whereas an afocal converter lens wherein a negative lens group and a positive lens group are disposed in order from a subject side thereof is called a wide-converter lens. In either case, the optical system is located on the subject side of a master lens, and so the diameter thereof becomes very large. Consequently, when the optical system is constructed of glass, its weight becomes too heavy to make full advantage of its convenience. However, a conventional approach to eliminating these problems results in a performance drop or the need of using material poor in productivity, as already explained in conjunction with the prior art.

In designing such an afocal converter lens system, correction of chromatic aberrations is of importance. Referring here to an optical system designed to make the focal length of an associated system long, esp., a tele-converter lens system, longitudinal chromatic aberration is likely to become worse throughout a picture plane, i.e., from the center thereof to the periphery thereof. Thus, correction of chromatic aberrations is of importance, and so each lens group is generally often made up of a doublet. On the other hand, the wide-converter lens system is likely to produce large distortion and astigmatism because its field angle becomes larger than that of the master lens system. To make correction for these monochromatic aberrations, negative power is often allocated to a plurality of negative lenses. Correction of chromatic aberration of magnification, too, is of importance.

The present invention has for its object to achieve satisfactory correction of chromatic aberrations at low costs by making effective use of a diffractive surface. To this end it is required to use diffractive surfaces in at least two lens groups forming the converter lens system.

Figure 4:
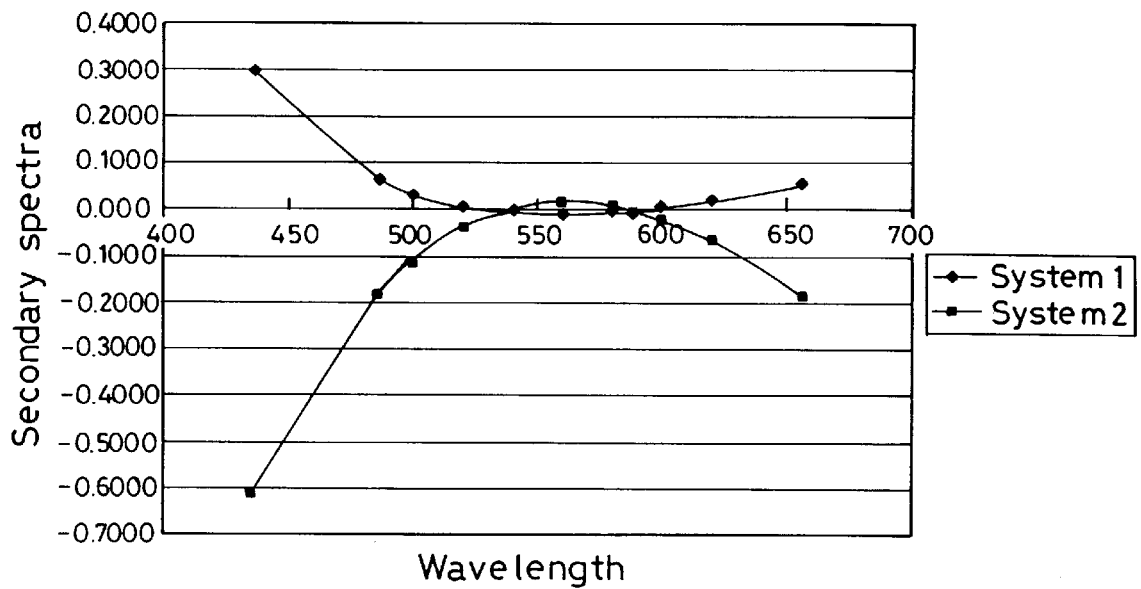
FIG. 4 is illustrative of one example of calculation for secondary spectra in refractive, and diffractive systems.

As explained in conjunction with the prior art, a diffractive surface has very strong anomalous dispersion, and leaves larger amounts of chromatic aberrations upon achromatization, as compared with an ordinary glass lens. One example of calculation for secondary spectra is given in FIG. 4 that shows secondary spectra when a lens of 100 mm in focal length is achromatized at C- and F-lines provided that the lens is regarded as being a thin contact lens system. A refractive surface system (system 1) is made up of a glass doublet consisting of a glass lens where $n_d=1.69680$ and $v_d=55.52$ combined with a glass lens where $n_d=1.68893$ and $v_d=31.07$. On the other hand, a diffractive surface system (system 2) is made up of an acrylic resin where $n_d=1.49241$ and $v_d=57.66$ combined with a diffractive surface. As can be seen from FIG. 4, the use of the diffractive surface causes the amount of remnant chromatic aberrations at g-line to become large.

Thus, the diffractive surface has by itself a large amount of remnant chromatic aberrations due to its anomalous dispersion, and so its power cannot be increased. However, satisfactory performance can be achieved by using diffractive surfaces in the positive and negative lenses because the remnant chromatic aberrations are offset each other. It is therefore important that a diffractive surface be formed in each of the positive and negative lens groups in the converter lens system of the invention.

At this time, the power of each diffractive surface has the same sign as that of each lens group. The reason can be understood by applying an achromatic condition for a thin contact lens system to the diffractive surface, as will be briefly described.

Generally, the achromatic condition for a doublet is represented as follows. Here let $f_1$ and $v_1$ represent the focal length and Abbe's number of a first lens, and $f_2$ and $v_2$ represent the focal length and Abbe's number of a second lens. Then, an equation for finding the composite focal length f of the thin contact lens system, and a condition for making correction for paraxial chromatic aberration are given by $$1/f = 1/f_1 + 1/f_2 \tag{e}$$

$$1/(f_1 \times v_1) + 1/(f_2 \times v_2) \tag{f}$$

From both the equations, $$f_1 = (1 - v_2/v_1) \times f \tag{g}$$

$$f_2 = (1 - v_1/v_2) \times f \tag{h}$$

Since the refractive system has a positive Abbe's number, a positive and negative lens combination is required to meet the aforesaid achromatic condition. However, the diffractive surface has an Abbe's number of −3.45. From equations (g) and (h), therefore, $f_1$ has the same sign as $f_2$. For instance, when a diffractive surface is formed on an acrylic resin substrate, 94.4% of power is allocated to the substrate and 5.6% to the diffractive surface. It is thus found that the diffractive surface has a positive yet very weak power. By use of the diffractive surface, it is possible to control the amount of chromatic aberrations produced and, hence, achieve weight and cost reductions without increasing the number and thickness of lenses.

As mentioned above, the diffractive surfaces according to the invention have positive power in the positive lens group and negative power in the negative lens group.

Figure 5A:
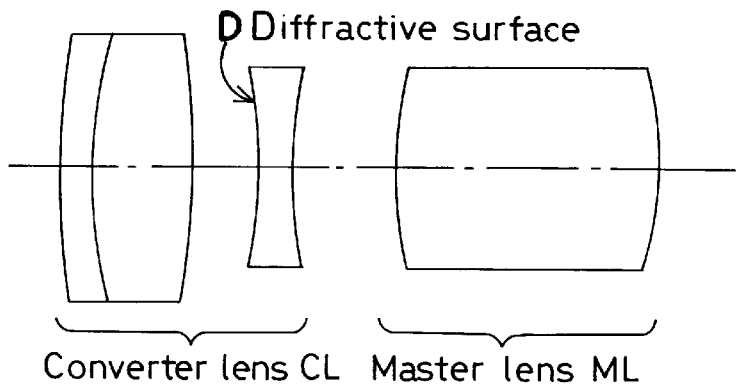
FIG. 5(a) shows the diffractive surface on the fist lens group.
Figure 5B:
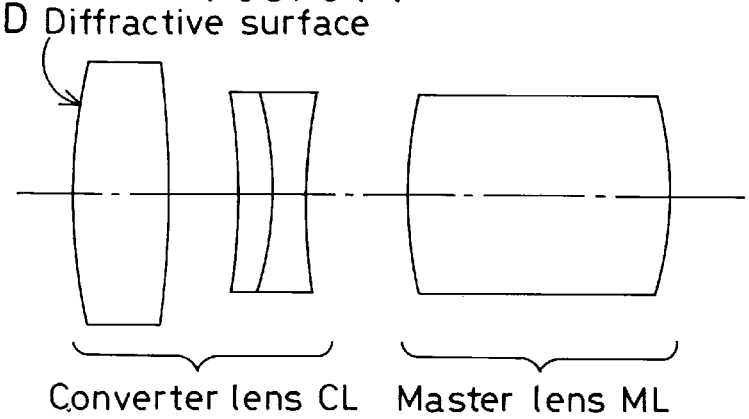
FIG. 5(b) shows the diffractive surface on the second lens group.

A possible lens arrangement for making correction for chromatic aberrations may be made up of one lens group with a diffractive surface D used therein and another lens group consisting of a refractive doublet, as shown in FIGS. 5(a) and 5(b). FIG. 5(a) shows a converter lens system CL comprising a doublet of positive power and a single lens having negative power with a diffractive surface D used therein, and FIG. 5(b) shows a converter lens system CL comprising a single lens having positive power with a diffractive surface D used therein and a doublet of negative power. However, each arrangement is not preferred because upon imparting power to the diffractive surface D, the amount of remnant chromatic aberrations is increased due to the anomalous dispersion of the diffractive surface.

Next, it is desired that the diffractive surface meet the following condition:

$$0.2 < |\phi_{DOE(1)}/\phi_{DOE(2)}| < 1.6 \tag{1}$$

Here $\phi_{DOE(1)}$ is a power that the diffractive surface in the first lens group has at a position through which an axial marginal ray having a maximum diameter passes and $\phi_{DOE(2)}$ is a power that the diffractive surface in the second lens group has at a position through which an axial marginal ray having maximum diameter passes.

Here let n represent the d-line index of refraction of the diffractive surface as expressed by the ultra-high index method, and $r_1$ and $r_2$ represent the radii of curvature of the first and second surfaces, respectively. Then, the power QDOE of the diffractive surface is defined by $$\phi_{DOE} = (n-1)(1/r_1 - 1/r_2) \tag{i}$$

The radius of curvature r at a height y from an optical axis is then defined by $$r = y \times [1+\{df(y)/dy\}^2]/\{d^2f(y)/dy^2\} \quad (j)$$

where f(y) represents a shape of the surface at the height y from the optical axis, d/dy is first order differential, and $d^2/dy^2$ is second order differential. In the case of a spherical surface, it is found from equation (j) that r is constant and equal to the paraxial radius of curvature.

Condition (1) gives a definition of the power that each of the two diffractive surfaces used in the positive and negative lens groups has at a position through which an axial marginal ray having a maximum diameter passes, and indicates that there is a small difference between the powers of the two diffractive surfaces. When there is a deviation from the range defined by conditions (1), i.e., there is a significant difference in power between the diffractive surfaces used in the positive and negative lens groups, the influence of the anomalous dispersion of the diffractive surfaces becomes too large to make satisfactory correction for chromatic aberrations.

It is also desired that the power of each diffractive surface satisfy the following condition:

$$0.005 < \phi_{DOE}/\phi < 0.3 \quad (2)$$

where $\phi_{DOE}$ is the power of the diffractive surface, and $\phi$ is the power of the lens group with the diffractive surface used therein.

In the present invention, the power of the diffractive surface has the same sign as that of the lens group, therefore condition (2) has always a positive value. When the lower limit of 0.005 in condition (2) is not reached, chromatic aberrations remain under-corrected. When the upper limit of 0.3 in condition (2) is exceeded, on the other hand, chromatic aberrations remain over-corrected.

In the present invention, chromatic aberrations are well corrected by making effective use of the diffractive surfaces. However, a large amount of astigmatism is produced at the diffractive surfaces, resulting in a deterioration in the quality of a marginal image surface. The use of an aspherical surface is effective for improving the image surface quality that has deteriorated under the influence of the diffractive surfaces. By use of the aspherical surface, it is possible to make correction for a meridional image surface in particular. At this time, however, the image surface quality at each diffractive surface has deteriorated, and so it is desired to use at least as many aspherical surfaces as the diffractive surfaces. For instance, an aspherical action that the diffractive surface itself has, too, may be used for the aspherical surface. It is also possible to form the surface of the diffractive surface material into an aspherical shape. It is acceptable to locate the aspherical surface on a surface of an element other than the diffractive surface. Since the astigmatism that has deteriorated at the diffractive surface is canceled by the aspherical surface, however, it is preferable to locate the aspherical surface as close to the diffractive surface as possible.

It is preferable that the converter lens system of the invention comprise a positive lens group and a negative lens group, and that each lens group be composed of one diffractive optical element.

In order to make effective correction for chromatic aberrations using the diffractive surfaces, it is preferable to satisfy the following condition:

$$v_d > 50 \quad (3)$$

where $v_d$ is an Abbe's number at d-line of a substrate material forming the diffractive optical element.

For a positive and negative lens combination such as that described in Example 1 to be given later, it is required to use a positive lens having a large Abbe's number and a negative lens having a small Abbe's number for achromatic purposes. However, the object of the invention is to achromatize each lens group by making use of the diffractive surface. At this time, it is not preferable to use a material having an Abbe's number of less than 50 as measured at d-line, i.e., a material deviating from the range defined by condition (3) because, as can be understood from equations (g) and (h), the power of the diffractive surface becomes too strong. The same is also true of even the case where condition (3) is satisfied by one lens group. In other words, some considerable chromatic aberrations produced at the other lens group deviating from condition (3) can not be corrected. Especially secondary spectra produced due to anomalous dispersion cannot be corrected no matter how many refractive lenses are used. Thus, condition (3) is very important to achieve sufficient performance.

Many materials conforming to condition (3) are now available. From a production cost perspective, however, it is preferable to use a resinous material. To this end, only a kinoform type of mold need be prepared by ultra-precision processing. Thus, ordinarily available injection molding can be used to mass produce diffractive optical elements at low cost.

In the practice of the invention, it is preferable to select an acrylic resin from plastic materials conforming to condition (3). The acrylic resin has generally wide applications in lenses for cameras or the like, and so acrylic resin elements can be produced in stable manners at low costs. However, an optical system having a large lens diameter and comprising a positive and negative lens combination such as one contemplated in the invention is susceptible to complicated changes due to absorption of moisture. In the practice of the invention, it is thus desired to use a material of low hygroscopicity for plastic lenses. A preferred plastic material of low hygroscopicity now put to practical use is a polyolefinic resin.

When the lens group is made up of a plurality of lenses, the following condition must be satisfied so as to make effective correction for chromatic aberrations by use of a diffractive surface.

$$\Psi_d > 50 \quad (4)$$

Here, $1/\Psi_d = (1/\phi)\Sigma_i(\phi_i/v_{di})$ where $\phi$ is the power of a lens group having a diffractive surface therein, $\phi_i$ are the powers of lenses forming that lens group and a diffractive optical element (from which the power of the diffractive surface is excluded), and $v_{di}$ are the Abbe's numbers at d-line of lenses forming that lens group and the diffractive optical element.

As explained in conjunction with condition (3), unless the lens group has a large equivalent Abbe's number, it is then impossible to make satisfactory correction for chromatic aberrations because the power of the diffractive surface becomes too strong. It is thus desired that the value $\Psi_d$ calculated from the power and Abbe's number of each of lenses (except for the diffractive surface) forming the lens group satisfies condition (4).

In this case, too, it is desired that the diffractive optical element be made up of a resinous material. Especially by use of a resinous material of low hygroscopicity such as polyolefinic resin, optical elements stable with respect to humidity changes can be mass produced.

Then, the front converter lens system using a diffractive surface according to the invention will be explained with reference to Examples 1 to 7.

A diffractive surface in the lens system according to the invention is designed using the ultra-high index method, and specifically expressed by a refractive index of 1001 at null thickness and d-line wavelength. The index of refraction at other line-wavelengths is calculated from equation (d). In numerical data given below an ordinary aspherical equation such as one shown below is used. Here let a Z-axis and a Y-axis be an optical axis direction and a direction perpendicular to the optical axis, respectively. Then, the aspherical surface is given by $$Z=CY^2/[1+\sqrt{1-(1+K)C^2Y^2}]+A_4Y^4+A_6Y^6+A_8Y^8+A_{10}Y^{10}+A_{12}Y^{12} \quad (k)$$

where C is curvature at a surface apex (=1/r where r is the radius of curvature), K is a conical coefficient, and $A_4$, $A_6$, $A_8$, $A_{10}$, and $A_{12}$ are fourth, sixth, eighth, tenth, and twelfth aspherical coefficients, respectively.

The surface coming in contact with the diffractive surface at null thickness is a surface of the substrate material. In actual production, the diffractive surface is formed on the surface of the substrate material using a phase change found from a difference between the aspherical shape of the diffractive surface and the surface shape of the material and the indices of refraction. In other words, it is the surface of the substrate material which has final lens action in each of the examples given later. In this regard, it is to be noted that an aspherical surface defined by an ultra-high index refractive lens and here called the diffractive surface does not actually exist. In the lens section corresponding to each example, however, surface Nos. denoting the diffractive surfaces in the numerical data are shown in terms of $r_1$, $r_{19}$, etc.

Figure 1:
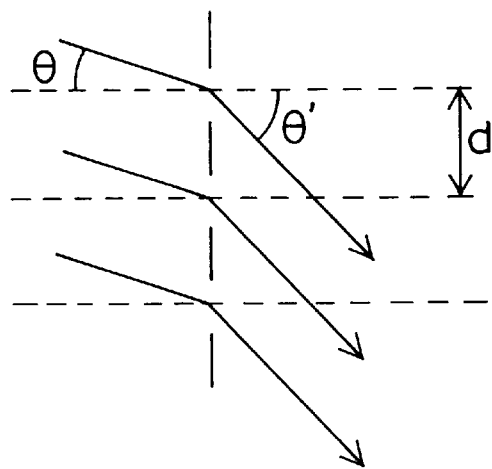
FIG. 1 is schematically illustrative of a diffraction phenomenon.
Figure 2:
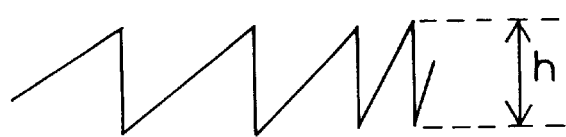
FIG. 2 is a sectional view illustrative of one typical section of a kinoform.
Figure 3:
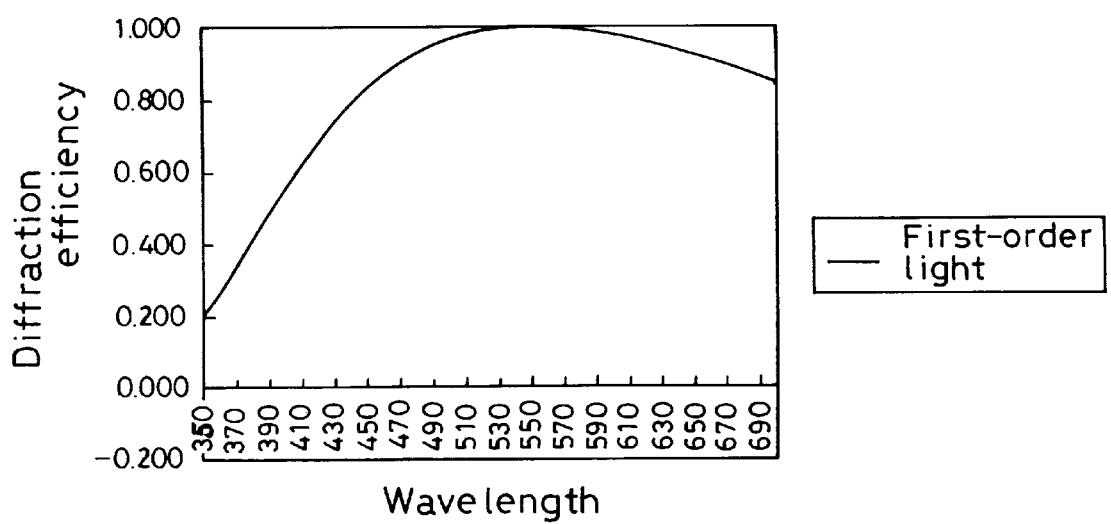
FIG. 3 is a graph illustrative of a wavelength vs. diffraction efficiency relation at a design wavelength of 500 nm.
Figure 6:
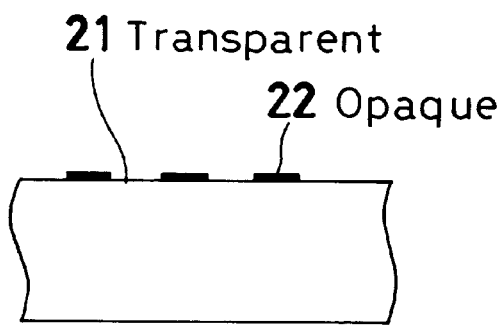
FIG. 6 is illustrative of a specific sectional shape of the diffractive surface used in the invention.
Figure 6:
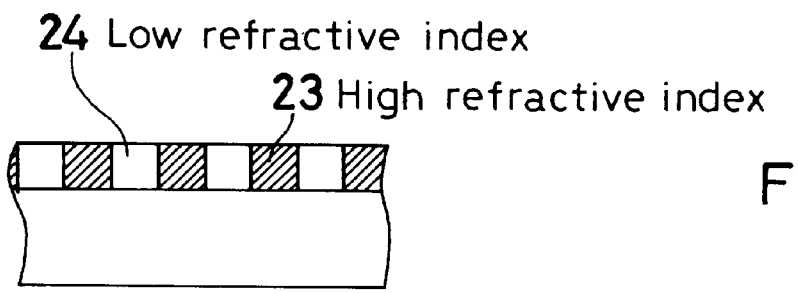
Figure 6:
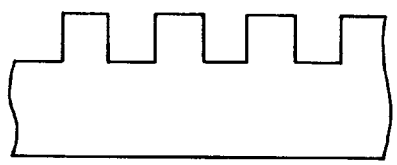
Figure 6:
Figure 6:
Figure 6:

Some exemplary sectional shapes of the diffractive surface are shown in FIG. 6. Shown in FIG. 6(a) is a diffractive surface called an amplitude-modulated type wherein an alternate arrangement of transparent and opaque portions 21 and 22 is provided, with the thickness of each opaque portion 22 being substantially zero. Shown in FIG. 6(b) is an alternate arrangement of high- and low-refractive index portions 23 and 24, to which diffraction is imparted through a phase difference due to a refractive index difference. Shown in FIG. 6(c) is an alternate arrangement of rectangular asperties, to which diffraction is imparted through a phase difference due to a thickness difference. This arrangement is also called a 2-level binary element. Shown in FIG. 6(d) is a kinoform arrangement having a saw-toothed surface, to which diffraction is imparted by a phase difference due to a continuous thickness difference (see FIG. 2). FIGS. 6(e) and 6(f) are illustrative of binary elements to 4-, and 8-level approximation (see FIG. 3). Thus, several diffractive surface shapes are available. In the practice of the invention, however, it is preferable to use the kinoform of FIG. 6(d), and the 4-, or more level binary elements of FIGS. 6(e) and 6(f) so that the diffraction efficiency can be increased to make full use of the quantity of light.

Figure 7A:
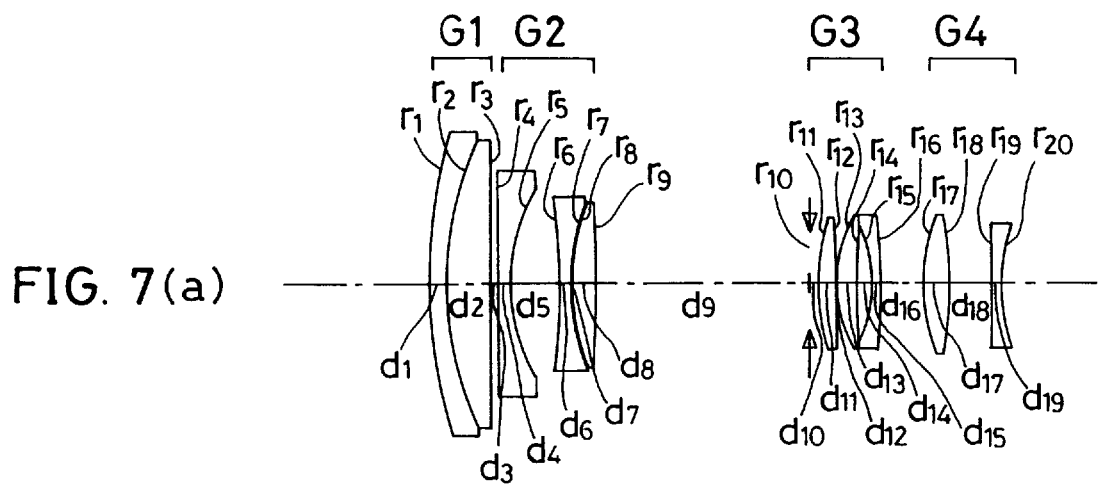
FIG. 7(a) shows the lens system in a wide-angle configuration.
Figure 7B:
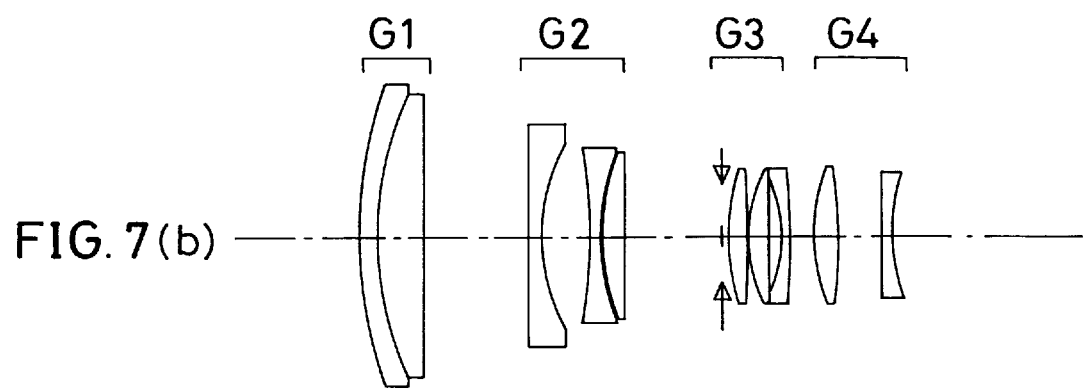
FIG. 7(b) shows the lens system in an intermediate configuration.
Figure 7C:
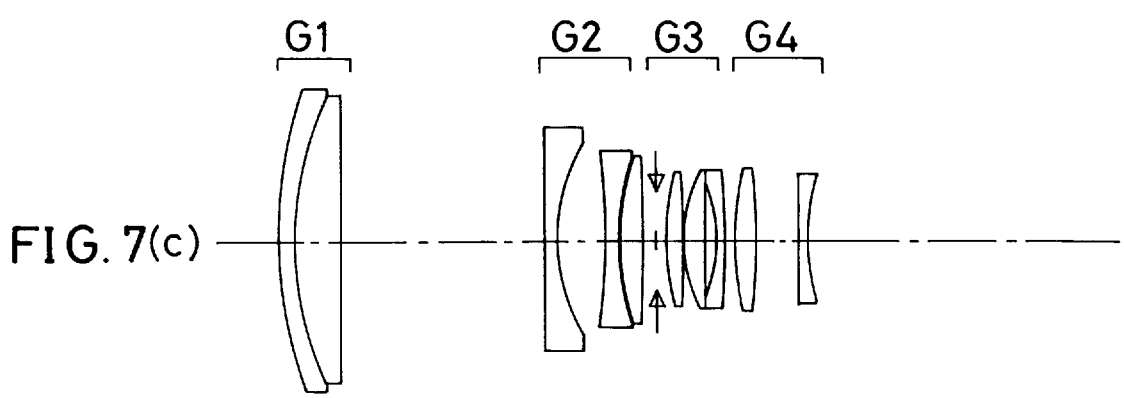
FIG. 7(c) shows the lens system in a telephoto configuration.

Numerical data concerning Examples 1 to 7 of the invention, and numerical data concerning the master lens system mounted thereon will be given later. Examples 1 to 5 are directed to converter lens systems mounted on a side of a master lens system ML1 shown in FIG. 7, which faces a subject, thereby varying a focal length of the master lens system ML1. More specifically, Examples 1 to 4 are directed to tele-converter lens systems mounted on the master lens system ML1 to make the focal length thereof long. Only Example 5 is directed to a wide-converter lens system mounted on the master lens system to make the focal length thereof short. Sections of the master lens system ML1 at a wide-angle end thereof, an intermediate focal length thereof, and a telephoto end thereof, respectively, are shown in FIGS. 7(a), 7(b), and 7(c). The master lens system ML1 is of a zoom lens type having a focal length of about 29 to 106 mm, or about 31 to 123 mm calculated as a 35 mm camera lens. This zoom lens type is a positive/negative/positive/positive four lens group type. Each of the tele-converter lens systems according to Examples 1 to 4 is mounted on the subject-side of the master lens system ML1 at a telephoto end position thereof, and has a zoom ratio of 1.4. The wide-converter lens system according to Example 5 is mounted on the subject-side of the master lens system ML1 at a wide-angle end position thereof, and has a zoom ratio of 0.8.

The master lens system ML1 shown in FIG. 7 is made up of a first lens group G1, a second lens group G2, a third lens group G3 and a fourth lens group G4 in order from a subject side thereof. The first lens group G1 is made up of a doublet consisting of a negative meniscus lens convex on an object side thereof and a positive meniscus lens, the second lens group G2 is made up of a plano-concave lens, a double-concave lens and a double-convex lens, the third lens group G3 is made up of an aperture stop, a double-convex lens, a positive meniscus lens convex on a subject side thereof and a negative meniscus lens convex on an image side thereof, and the fourth lens group G4 is made up of a double-convex lens and a negative meniscus lens convex on a subject side thereof. Two aspherical surfaces are used, one at a subject-side surface of the double-convex lens in the third lens group G3 and another at a subject-side surface of the negative meniscus lens in the fourth lens group G4. For zooming from a wide-angle end to a telephoto side of the system, the four lens groups G1 to G4 are all moved while a space between the first and second lens groups G1 and G2 becomes wide, and spaces between the second and third lens groups G2 and G3 and the third and fourth lens groups G3 and G4 become narrow.

Figure 8:
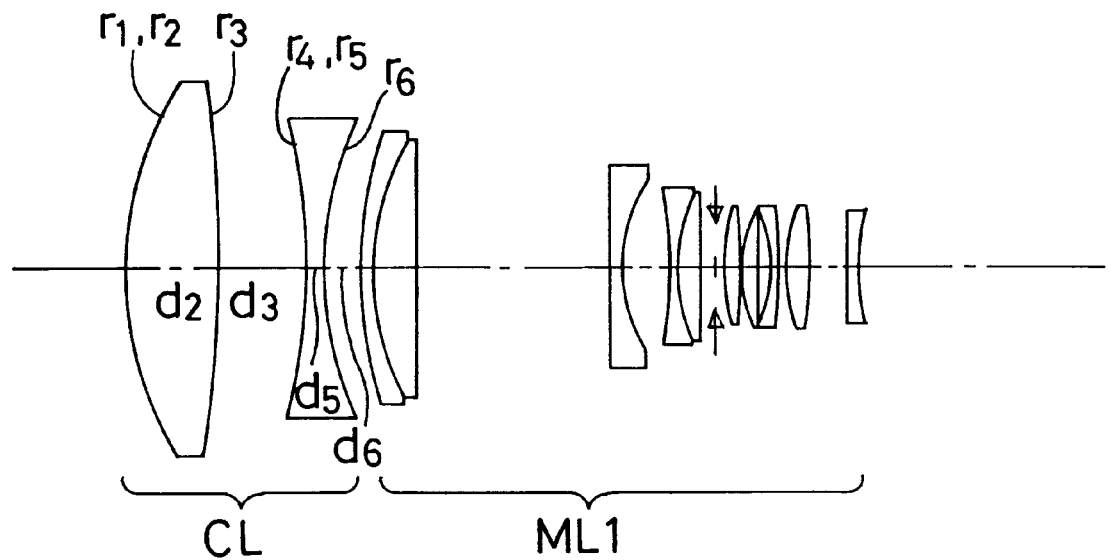
FIG. 8 is a sectional view of Example 1 of the front converter lens system of the invention, which is mounted at a telephoto end position of the first master lens system.

FIG. 8 is a sectional schematic of Example 1 of the converter lens system CL mounted on the subject-side of the master lens system ML1 at a telephoto end position thereof. This converter lens system CL is made up of, in order from a subject side thereof, a lens group consisting of a double-convex positive lens and a lens group consisting of a double-concave negative lens, two lens groups in all and two lenses in all. Each lens is made up of polyolefinic resin, and a side thereof facing a subject is defined by a diffractive surface. The polyolefinic resin is a resinous material of low hygroscopicity, and a lens system made thereof is substantially unsusceptible to humidity changes in an environment in which it is used. The resinous material is also suitable for the mass production of optical elements. The surface of the substrate material forming each diffractive surface is of a spherical shape. For this reason, the aspherical action for correction of aberrations can be borne by the aspherical action the diffractive surface itself has.

Although not illustrated, Example 2 of the converter lens system CL, comprises, in order from a subject side thereof, a first lens group consisting of a double-convex positive lens and a second lens group consisting of a double-concave negative lens, two lens groups in all or two lenses in all, as in Example 1. Each lens is made up of a polyolefinic resin of low hygroscopicity. A side of each lens that faces a subject is defined by a diffractive surface formed of a substrate material having an aspherical surface. Each diffractive surface, too, has an aspherical surface.

Figure 9:
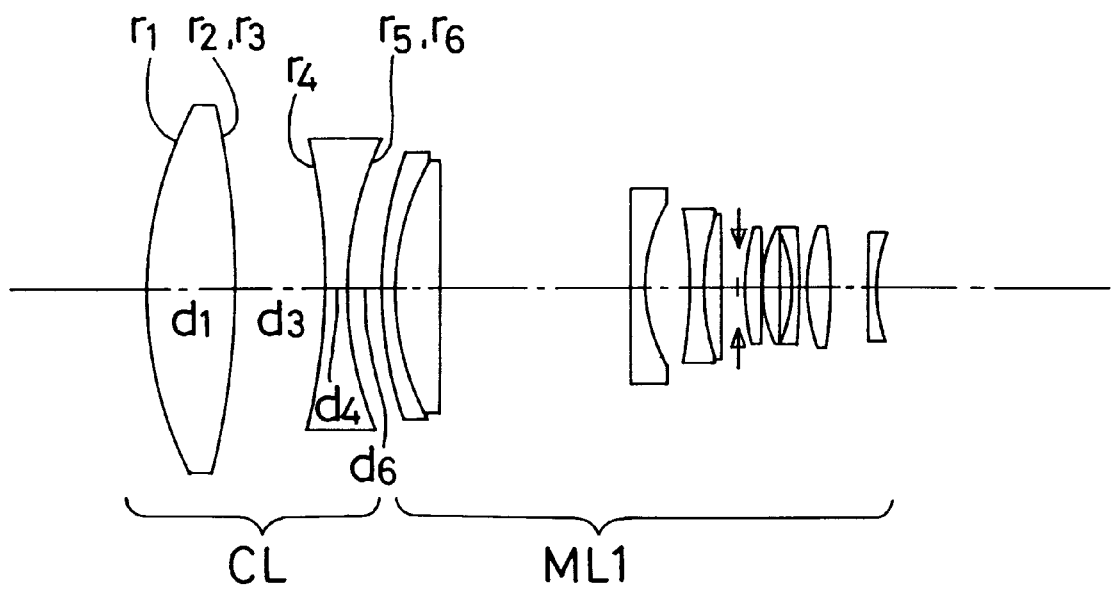
FIG. 9 is a sectional view of Example 3 of the front converter lens system of the invention, which is mounted at a telephoto end position of the first master lens system.

FIG. 9 is a sectional schematic of Example 3 of the converter lens system CL mounted on the subject-side of the master lens system ML1 at a telephoto end position thereof. Example 3 of the converter lens system CL, too, comprises, in order from a subject side thereof, a first lens group consisting of a double-convex positive lens and a second lens group consisting of a double-concave negative lens, two lens groups in all or two lenses in all, as in Example 1. Both the lenses are made up of a commonly available acrylic resin. The acrylic resin is more susceptible to changes by humidity than a low-hygroscopicity material. However, acrylic resin lenses can be fabricated with high productivity yet at low costs. In this example, diffractive surfaces, each formed of a substrate material having a spherical surface, are used on sides of both the positive and negative lenses that face an image. For correction of aberrations, aspherical surfaces are used at surfaces of the substrate materials that face away from the diffractive surfaces. Each diffractive surface has an aspherical action. For better correction of aberrations, however, it is preferable to use aspherical surfaces having a refractive action apart from the diffractive surfaces having an aspherical action.

Figure 10:
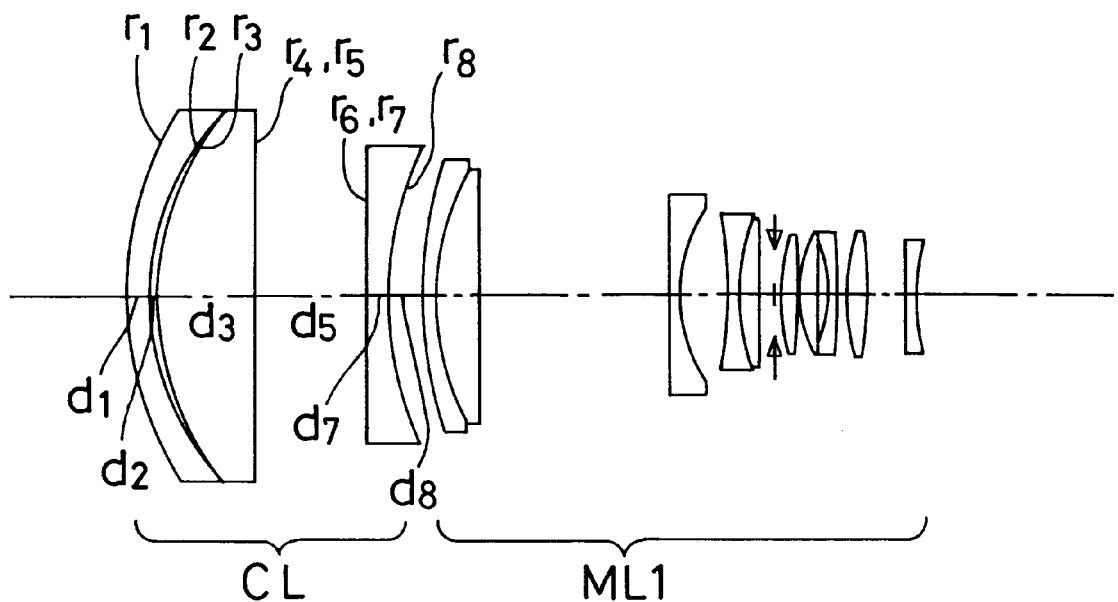
FIG. 10 is a sectional view of Example 4 of the front converter lens system of the invention, which is mounted at a telephoto end position of the first master lens system.

FIG. 10 is a sectional schematic of Example 4 of the converter lens system CL mounted on the subject-side of the master lens system ML1 at a telephoto end position thereof. As illustrated, Example 4 of the converter lens system CL comprises, in order from a subject side thereof, a positive lens group consisting of a negative meniscus lens convex on a subject side thereof and a plano-convex positive lens, and a negative lens group consisting of a double-concave negative lens, two lens groups in all or three lenses in all. Diffractive surfaces are used, one on a side of the plano-convex positive lens that faces an image and one on a side of the double-concave negative lens that faces a subject, and an aspherical surface is used on a side of the double-concave negative lens that faces the image. Each diffractive surface also, has an aspherical action. The positive lens group is made up of two lenses because only by use of the aspherical actions that the diffractive surfaces have, chromatic aberrations cannot be corrected in a well-balanced state. The first lens is a glass lens, and the second and third lenses are acrylic resin lenses.

Figure 11:
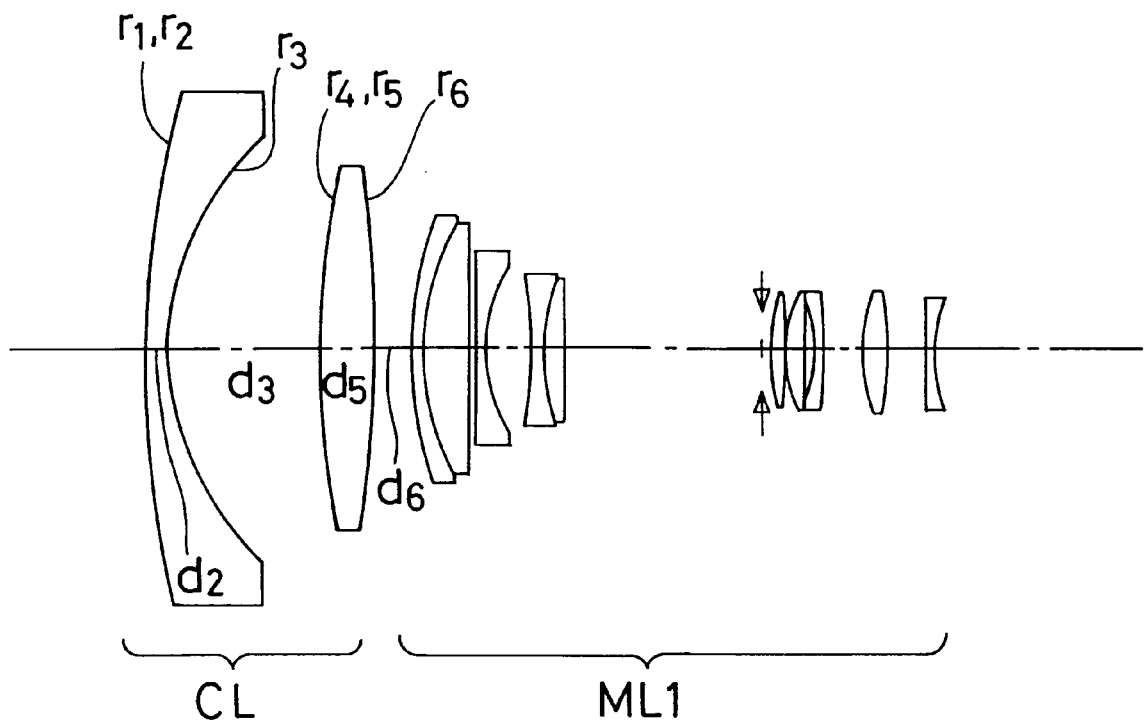
FIG. 11 is a sectional view of Example 5 of the front converter lens system of the invention, which is mounted at a wide-angle end position of the first master lens system.

FIG. 11 is a sectional schematic of Example 5 of the converter lens system CL mounted on the subject-side of the master lens system ML1 at a wide-angle end position thereof. As shown, Example 5 of the converter lens system CL comprises, in order from a subject side thereof, a lens group consisting of a negative meniscus lens convex on a subject side thereof and a lens group consisting of a double-convex lens, two lens groups in all or two lenses in all. Each lens is made up of a polyolefinic lens of low hygroscopicity, and a diffractive surface is used on a side of each lens that faces a subject. A substrate material forming each diffractive surface has a spherical surface, and the aspherical action of the diffractive surfaces themselves is used for the aspherical action for correction of aberrations.

Figure 12:
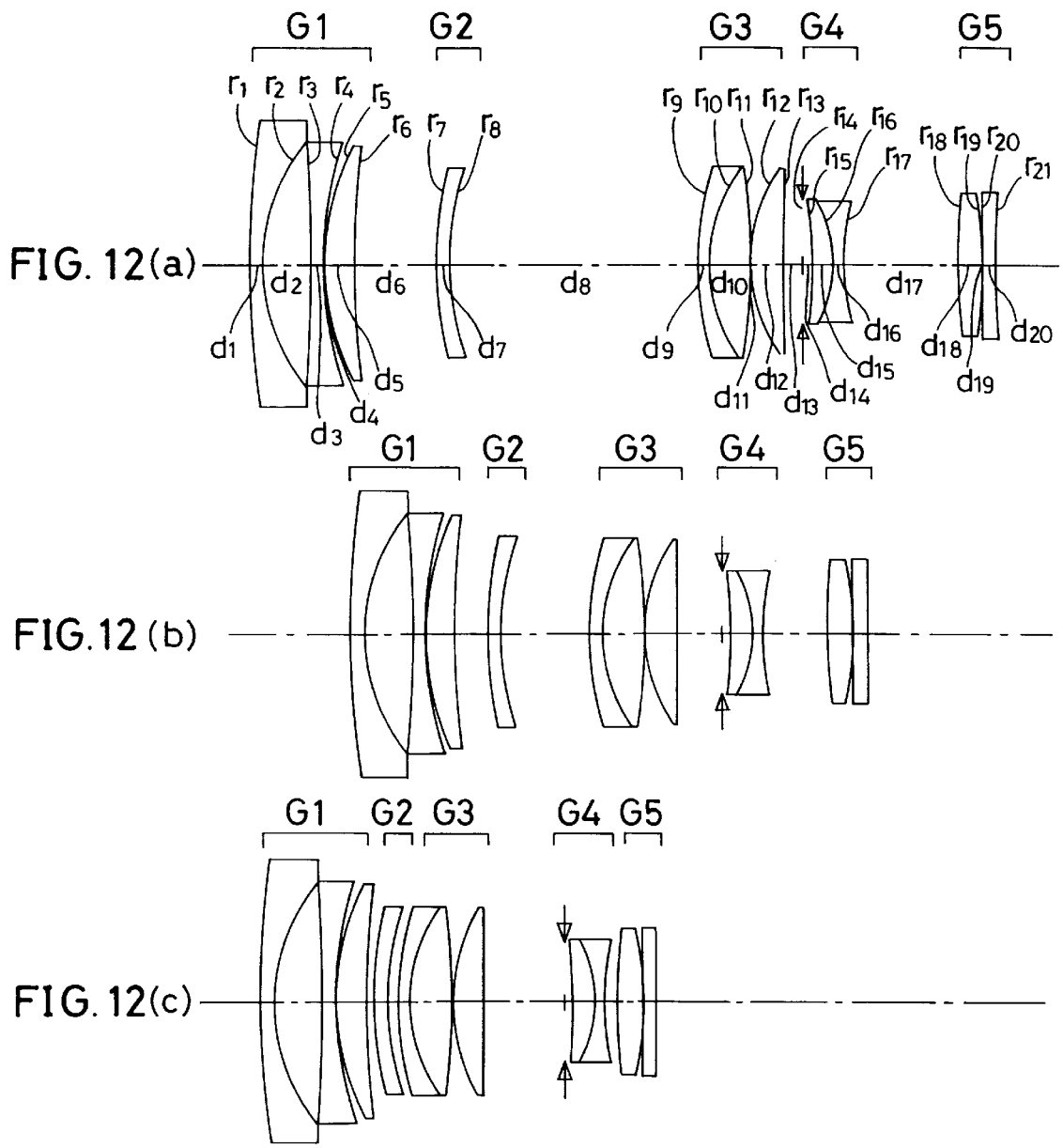
FIG. 12 is illustrative of a second master lens system on which the front converter lens system of the invention is to be mounted.

Examples 6 and 7 are each directed to a converter lens system mounted on a side of a master lens system ML2 shown in FIG. 12 that faces a subject to vary a focal length thereof. More specifically, Example 6 is directed to a tele-converter lens system mounted on the master lens system ML2 to make the focal length thereof long, and Example 7 is directed to a wide-converter lens system mounted on the master lens system ML2 to make the focal length thereof short. Sections of the master lens system ML2 at a wide-angle end thereof, an intermediate focal length thereof, and a telephoto end thereof, respectively, are shown in FIGS. 12(a), 12(b), and 12(c). The master lens system ML2 is of a zoom lens type having a focal length of about 29 to 106 mm. This zoom lens type is a negative/negative/positive/negative/positive lens group type or a so-called negative lens group precedent type. The tele-converter lens system according to Example 6 is mounted on the subject-side of the master lens system ML2 at a telephoto end position thereof, and has a zoom ratio of 1.4. The wide-converter lens system according to Example 7 is mounted on the subject-side of the master lens system ML2 at a wide-angle end position thereof, and has a zoom ratio of 0.8.

The master lens system ML2 shown in FIG. 12 comprises, in order from a subject side thereof, a first lens group G1 consisting of a negative meniscus lens convex on a subject side thereof, a double-concave lens and a positive meniscus lens convex on a subject side thereof, a second lens group G2 consisting one negative meniscus lens convex on a subject side thereof, a third lens group G3 consisting of a doublet composed of a negative meniscus lens convex on a subject side thereof and a double-convex lens and a plano-convex lens, a fourth lens group G4 consisting of an aperture stop and a doublet composed of a positive meniscus lens convex on an image side thereof and a double-concave lens, and a fifth lens group G5 consisting of a double-convex lens and a double-concave lens. For zooming from a wide-angle end to a telephoto end of the master lens system, both the first and second lens groups G1 and G2 are moved along a concave orbit, so that the first lens group 1 is located nearer to the image side at the telephoto end than at the wide-angle end, and the second lens group G2 is located nearer to the subject side at the telephoto end than at the wide-angle end. During zooming, the third to fifth lens groups G3 to G5 are moved toward the subject side while a space between the third and fourth lens groups G3 and G4 becomes wide and a space between the fourth and fifth lens groups G4 and G5 becomes narrow.

Figure 13:
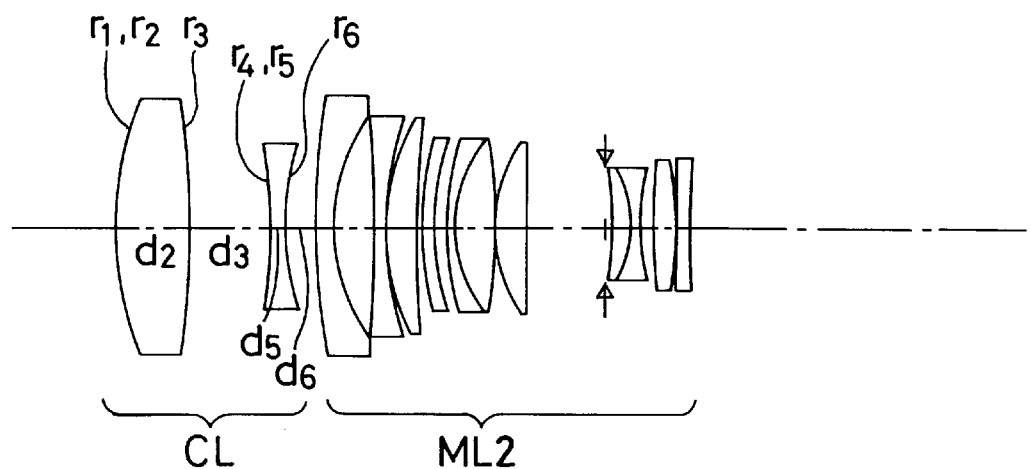
FIG. 13 is a sectional view of Example 6 of the front converter lens system of the invention, which is mounted at a telephoto end position of the second master lens system.

FIG. 13 is a sectional schematic of Example 6 of the converter lens system CL mounted on the subject-side of the master lens system ML2 at a telephoto end position thereof. As illustrated, Example 6 of the converter lens system CL comprises, in order from a subject side thereof, a lens group consisting of a double-convex positive lens and a lens group consisting of a double-concave negative lens, two lens groups in all or two lenses in all. Each lens is made up of a glass material, and a diffractive surface is used on a side of each lens that faces a subject. A substrate material forming each diffractive surface has a spherical surface, and the aspherical action of the diffractive surface itself is used for the aspherical action for correction of aberrations.

Figure 14:
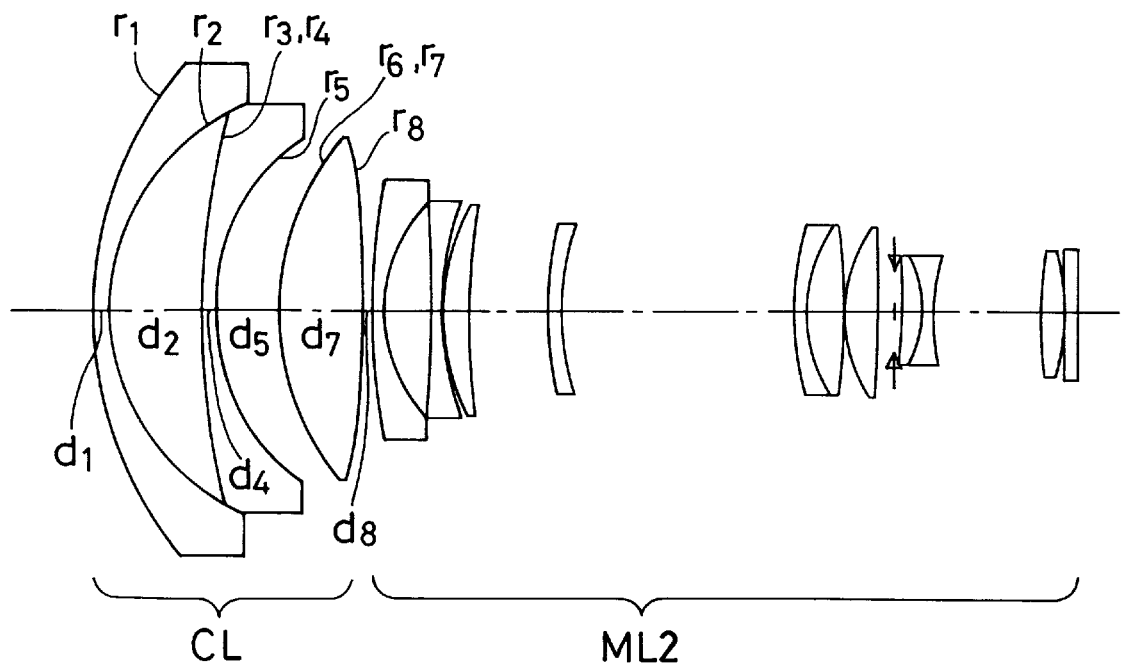
FIG. 14 is a sectional view of Example 7 of the front converter lens system of the invention, which is mounted at a wide-angle end position of the second master lens system.

FIG. 14 is a sectional schematic of Example 7 of the converter lens system CL mounted on the subject-side of the master lens system ML2 at a wide-angle end position thereof. As illustrated, Example 7 of the converter lens system CL comprises, in order from a subject side thereof, a negative lens group consisting of a negative meniscus lens convex on a subject side thereof, a negative lens group consisting of a negative meniscus lens convex on a subject side thereof, and a lens group consisting of a double-convex positive lens, three lens groups in all or three lenses in all. The first negative lens is made up of a glass material, and the second negative lens and positive lens are each made up of a polyolefinic resin of low hygroscopicity. Diffractive surfaces are used on sides of the second negative lens and positive lens that face a subject, and each diffractive surface has an aspherical action. Sides of the second negative lens and positive lens that face an image are each in an aspherical surface form. A substrate material forming each diffractive surface has a spherical surface.

All the examples have satisfactory performance. The converter lens of the invention can be applied not only to the aforesaid examples but also to optical systems using electronic imaging devices. The converter lens of the invention can be advantageously used with an imaging device to achieve an optical system excellent in portability because the phototaking lens used is very small.

Given below are numerical data on the master lens ML1 and ML2 as well as Examples 1 to 7 of the converter lens CL according to the invention, wherein f is a focal length (of converter lens CL when it is mounted on master lens ML1 or ML2), $F_{NO}$ is an F-number, $f_B$ is a back focus, $2\omega$ is a field angle of converter lens CL when it is mounted on master lens ML1 or ML2), $r_1, r_2 \ldots$ are radii of curvature of lens surfaces, $d_1, d_2 \ldots$ are spaces between adjacent lens surfaces, $\nu_{d1}, \nu_{d2} \ldots$ are d-line refractive indices of lenses, and $\nu_{d1}, \nu_{d2} \ldots$ are d-line Abbe's numbers, and the aspherical shape is represented by the aforesaid equation (k). Diffractive surfaces are indicated by "Dif. surf.".

Master lens ML 1

$f = 25.10 \sim 49.98 \sim 99.90$
$F_{NO} = 4.50 \sim 5.10 \sim 5.60$
$f_B = 33.66 \sim 46.66 \sim 63.73$
$2\omega = 69.15° \sim 38.18° \sim 19.85°$

| | | | |
|---|---|---|---|
| $r_1 = 57.80900$ | $d_1 = 2.000$ | $n_{d1} = 1.84666$ | $\nu_{d1} = 23.78$ |
| $r_2 = 37.75400$ | $d_2 = 5.900$ | $n_{d2} = 1.72916$ | $\nu_{d2} = 54.68$ |
| $r_3 = 772.20100$ | $d_3 =$ (Variable) | | |
| $r_4 = \infty$ | $d_4 = 1.200$ | $n_{d3} = 1.77250$ | $\nu_{d3} = 49.60$ |
| $r_5 = 20.88600$ | $d_5 = 6.600$ | | |
| $r_6 = -62.16800$ | $d_6 = 1.200$ | $n_{d4} = 1.77250$ | $\nu_{d4} = 49.60$ |
| $r_7 = 28.92000$ | $d_7 = 0.200$ | | |
| $r_8 = 26.98400$ | $d_8 = 2.900$ | $n_{d5} = 1.84666$ | $\nu_{d5} = 23.78$ |
| $r_9 = -3780.74800$ | $d_9 =$ (Variable) | | |
| $r_{10} = \infty$ (Stop) | $d_{10} = 1.000$ | | |
| $r_{11} = 35.13300$ (Aspheric) | $d_{11} = 2.200$ | $n_{d6} = 1.51633$ | $\nu_{d6} = 64.14$ |
| $r_{12} = -148.92300$ | $d_{12} = 0.200$ | | |
| $r_{13} = 18.46400$ | $d_{13} = 2.400$ | $n_{d7} = 1.48749$ | $\nu_{d7} = 70.23$ |
| $r_{14} = 125.95200$ | $d_{14} = 1.600$ | | |
| $r_{15} = -20.68600$ | $d_{15} = 1.200$ | $n_{d8} = 1.84666$ | $\nu_{d8} = 23.78$ |
| $r_{16} = -61.41600$ | $d_{16} =$ (Variable) | | |
| $r_{17} = 25.45700$ | $d_{17} = 3.100$ | $n_{d9} = 1.65844$ | $\nu_{d9} = 50.88$ |
| $r_{18} = -54.97200$ | $d_{18} = 5.400$ | | |
| $r_{19} = 127.57000$ (Aspheric) | $d_{19} = 1.200$ | $n_{d10} = 1.77250$ | $\nu_{d10} = 49.60$ |
| $r_{20} = 25.26400$ | | | |

Zooming Spaces

| f | 25.10 | 49.98 | 99.90 |
|---|---|---|---|
| $d_3$ | 1.000 | 13.750 | 26.349 |
| $d_9$ | 27.595 | 12.388 | 2.132 |
| $d_{16}$ | 5.469 | 2.906 | 1.000 |

Aspherical Coefficients

11th surface $K = 0$
$A_4 = 2.91810 \times 10^{-5}$
$A_6 = 1.38890 \times 10^{-7}$
$A_8 = 3.19220 \times 10^{-10}$
$A_{10} = 1.54360 \times 10^{-12}$ 19th surface $K = 0$
$A_4 = -7.74820 \times 10^{-5}$
$A_6 = -3.27320 \times 10^{-7}$
$A_8 = 2.53770 \times 10^{-9}$
$A_{10} = -2.14300 \times 10^{-11}$

Master lens ML 2

$f = 29.00 \sim 55.50 \sim 106.11$
$F_{NO} = 4.60 \sim 5.20 \sim 5.90$
$f_B = 38.86 \sim 58.08 \sim 89.48$
$2\omega = 73.36° \sim 42.53° \sim 23.01°$

| | | | |
|---|---|---|---|
| $r_1 = 134.74200$ | $d_1 = 2.200$ | $n_{d1} = 1.74320$ | $\nu_{d1} = 49.34$ |
| $r_2 = 27.08200$ | $d_2 = 7.000$ | | |
| $r_3 = -435.77500$ | $d_3 = 1.900$ | $n_{d2} = 1.75700$ | $\nu_{d2} = 47.82$ |
| $r_4 = 48.32800$ | $d_4 = 0.150$ | | |
| $r_5 = 36.75000$ | $d_5 = 4.500$ | $n_{d3} = 1.84666$ | $\nu_{d3} = 23.78$ |
| $r_6 = 131.81700$ | $d_6 =$ (Variable) | | |
| $r_7 = 62.21600$ | $d_7 = 2.000$ | $n_{d4} = 1.48749$ | $\nu_{d4} = 70.23$ |
| $r_8 = 44.14600$ | $d_8 =$ (Variable) | | |
| $r_9 = 45.52900$ | $d_9 = 1.500$ | $n_{d5} = 1.84666$ | $\nu_{d5} = 23.78$ |
| $r_{10} = 21.55000$ | $d_{10} = 6.500$ | $n_{d6} = 1.71300$ | $\nu_{d6} = 53.87$ |
| $r_{11} = 97.30900$ | $d_{11} = 0.150$ | | |
| $r_{12} = 25.21300$ | $d_{12} = 4.850$ | $n_{d7} = 1.48749$ | $\nu_{d7} = 70.23$ |
| $r_{13} = \infty$ | $d_{13} =$ (Variable) | | |
| $r_{14} = \infty$ (Stop) | $d_{14} = 1.000$ | | |
| $r_{15} = -95.67700$ | $d_{15} = 3.500$ | $n_{d8} = 1.80518$ | $\nu_{d8} = 25.42$ |
| $r_{16} = -17.36600$ | $d_{16} = 1.400$ | $n_{d9} = 1.76200$ | $\nu_{d9} = 40.10$ |
| $r_{17} = 39.84800$ | $d_{17} =$ (Variable) | | |
| $r_{18} = 88.51600$ | $d_{18} = 4.000$ | $n_{d10} = 1.53996$ | $\nu_{d10} = 59.45$ |
| $r_{19} = -39.40200$ (Aspheric) | $d_{19} = 0.150$ | | |
| $r_{20} = -97.54200$ | $d_{20} = 1.600$ | $n_{d11} = 1.80518$ | $\nu_{d11} = 25.42$ |
| $r_{21} = 215.60000$ | | | |

Zooming Spaces

| f | 29.00 | 55.50 | 106.11 |
|---|---|---|---|
| $d_6$ | 12.500 | 5.000 | 1.300 |

-continued

| | | | |
|---|---|---|---|
| $d_8$ | 36.894 | 13.364 | 1.465 |
| $d_{13}$ | 2.800 | 6.768 | 12.241 |
| $d_{17}$ | 16.887 | 9.657 | 1.800 |

Aspherical Coefficients

19th surface $K = 0$
$A_4 = 1.86700 \times 10^{-5}$
$A_6 = 9.98130 \times 10^{-9}$
$A_8 = 5.88780 \times 10^{-10}$
$A_{10} = -3.50960 \times 10^{-12}$
$A_{12} = 1.54810 \times 10^{-16}$ Example 1

$f = 138.80$
$F_{NO} = 5.60$
$f_B = 63.77$
$2\omega = 13.61°$

| | | | |
|---|---|---|---|
| $r_1 = 48.97222$(Dif. surf.) | $d_1 = 0.000$ | $n_{d1} = 1.1001$ | $\nu_{d1} = -3.45$ |
| $r_2 = 48.97447$ | $d_2 = 12.500$ | $n_{d2} = 1.52542$ | $\nu_{d2} = 55.78$ |
| $r_3 = -183.11500$ | $d_3 = 12.000$ | | |
| $r_4 = -75.10988$ (Dif. surf.) | $d_4 = 0.000$ | $n_{d3} = 1001$ | $\nu_{d3} = 3.45$ |
| $r_5 = -75.11731$ | $d_5 = 2.500$ | $n_{d4} = 1.52542$ | $\nu_{d4} = 55.78$ |
| $r_6 = 46.29700$ | $d_6 = 5.000$ | | |
| $r_7 = $ (Master lens ML 1) | | | |

Aspherical Coefficients

1st surface $K = 0$
$A_4 = -8.87656 \times 10^{-11}$
$A_6 = 3.81353 \times 10^{-13}$
$A_8 = -3.08442 \times 10^{-16}$
$A_{10} = 2.00542 \times 10^{-20}$ 4th surface $K = 0$
$A_4 = 5.44182 \times 10^{-10}$
$A_6 = -3.33951 \times 10^{-12}$
$A_8 = 8.50127 \times 10^{-15}$
$A_{10} = -6.55812 \times 10^{-18}$ Example 2

$f = 138.80$
$F_{NO} = 5.60$
$f_B = 63.77$
$2\omega = 13.60°$

| | | | |
|---|---|---|---|
| $r_1 = 45.93695$(Dif. surf.) | $d_1 = 0.000$ | $n_{d1} = 1.1001$ | $\nu_{d1} = -3.45$ |
| $r_2 = 45.93794$(Aspheric) | $d_2 = 12.500$ | $n_{d2} = 1.52542$ | $\nu_{d2} = 55.78$ |
| $r_3 = -167.88300$ | $d_3 = 11.400$ | | |
| $r_4 = -69.67337$(Dif. surf.) | $d_4 = 0.000$ | $n_{d3} = 1001$ | $\nu_{d3} = -3.45$ |
| $r_5 = -69.67520$(Aspheric) | $d_5 = 2.500$ | $n_{d4} = 1.52542$ | $\nu_{d4} = 55.78$ |
| $r_6 = 42.41400$ | $d_6 = 5.000$ | | |
| $r_7 = $ (Master lens ML 1) | | | |

Aspherical Coefficients

1st surface $K = 0$
$A_4 = -7.68319 \times 10^{-7}$
$A_6 = 1.29762 \times 10^{-10}$
$A_8 = -6.75618 \times 10^{-13}$
$A_{10} = -2.03618 \times 10^{-16}$ 2nd surface $K = 0$
$A_4 = -7.68665 \times 10^{-7}$
$A_6 = 1.29766 \times 10^{-10}$
$A_8 = -6.75976 \times 10^{-13}$
$A_{10} = -2.03376 \times 10^{-16}$ 4th surface $K = 0$
$A_4 = 3.21381 \times 10^{-6}$
$A_6 = -6.06373 \times 10^{-9}$
$A_8 = 2.24033 \times 10^{-11}$
$A_{10} = -2.14149 \times 10^{-14}$ -continued 5th surface K = 0
$A_4 = 3.21513 \times 10^{-6}$
$A_6 = -6.06518 \times 10^{-9}$
$A_8 = 2.24105 \times 10^{-11}$
$A_{10} = -2.14232 \times 10^{-14}$ Example 3

$f = 139.17$
$F_{NO} = 5.60$
$f_B = 63.78$
$2\omega = 13.57°$

| | | | |
|---|---|---|---|
| $r_1 = 51.35300$ (Aspheric) | $d_1 = 12.500$ | $n_{d1} = 1.49241$ | $\nu_{d1} = 57.66$ |
| $r_2 = -121.21363$ | $d_2 = 0.000$ | $n_{d2} = 1001$ | $\nu_{d2} = -3.45$ |
| $r_3 = -121.19629$ (Dif. surf.) | $d_3 = 13.000$ | | |
| $r_4 = -61.62500$ (Aspheric) | $d_4 = 2.500$ | $n_{d3} = 1.49241$ | $\nu_{d3} = 57.66$ |
| $r_5 = 46.97098$ | $d_5 = 0.000$ | $n_{d4} = 1001$ | $\nu d_4 = -3.45$ |
| $r_6 = 46.96780$ (Dif. surf.) | $d_6 = 5.000$ | | |
| $r_7 = $ (Master lens ML 1) | | | |

Aspherical Coefficients

1st surface

K = 0
$A_4 = -7.83793 \times 10^{-7}$
$A_6 = 9.17195 \times 10^{-11}$
$A_8 = -7.31972 \times 10^{-13}$
$A_{10} = -1.76287 \times 10^{-16}$ 3rd surface K = 0
$A_4 = 7.94643 \times 10^{-11}$
$A_6 = 5.22479 \times 10^{-14}$
$A_8 = -5.88702 \times 10^{-17}$
$A_{10} = -3.67373 \times 10^{-20}$ 4th surface K = 0
$A_4 = 3.38623 \times 10^{-6}$
$A_6 = -5.31456 \times 10^{-9}$
$A_8 = 1.88300 \times 10^{-11}$
$A_{10} = -1.56544 \times 10^{-14}$ 6th surface K = 0
$A_4 = 3.32817 \times 10^{-10}$
$A_6 = -1.56849 \times 10^{-12}$
$A_8 = 6.37440 \times 10^{-15}$
$A_{10} = -2.11766 \times 10^{-18}$ Example 4

$f = 138.80$
$F_{NO} = 5.60$
$f_B = 63.73$
$2\omega = 13.64°$

| | | | |
|---|---|---|---|
| $r_1 = 46.21400$ | $d_1 = 3.000$ | $n_{d1} = 1.60342$ | $\nu_{d1} = 38.03$ |
| $r_2 = 35.05100$ | $d_2 = 1.000$ | | |
| $r_3 = 37.11600$ | $d_3 = 14.000$ | $n_{d2} = 1.49241$ | $\nu_{d2} = 57.66$ |
| $r_4 = \infty$ | $d_4 = 0.000$ | $n_{d3} = 1001$ | $\nu_{d3} = -3.45$ |
| $r_5 = -950524.0000$ (Dif. surf.) | $d_5 = 15.500$ | | |
| $r_6 = -991.22897$ (Dif. surf.) | $d_6 = 0.000$ | $n_{d4} = 1001$ | $\nu_{d4} = -3.45$ |
| $r_7 = -992.57900$ | $d_7 = 2.500$ | $n_{d5} = 1.49241$ | $\nu_{d5} = 57.66$ |
| $r_8 = 40.17600$ (Aspheric) | $d_8 = 5.000$ | | |
| $r_9 = $ (Master lens ML 1) | | | |

Aspherical Coefficients

5th surface

K = 0
$A_4 = -5.72378 \times 10^{-11}$
$A_6 = 4.40443 \times 10^{-13}$
$A_8 = -8.92423 \times 10^{-16}$
$A_{10} = 4.62250 \times 10^{-19}$ 6th surface K = 0
$A_4 = -1.42685 \times 10^{-9}$
$A_6 = 1.02511 \times 10^{-11}$
$A_8 = -3.00125 \times 10^{-14}$ -continued $A_{10} = 2.74082 \times 10^{-17}$ 8th surface $K = 0$
$A_4 = -3.20639 \times 10^{-6}$
$A_6 = 2.18276 \times 10^{-8}$
$A_8 = -6.39040 \times 10^{-11}$
$A_{10} = 4.16156 \times 10^{-14}$ Example 5

$f = 20.08$
$F_{NO} = 5.60$
$f_B = 33.68$
$2\omega = 84.73°$

| | | | |
|---|---|---|---|
| $r_1 = 133.65720$(Dif. surf.) | $d_1 = 0.000$ | $n_{d1} = 1001$ | $\nu_{d1} = -3.45$ |
| $r_2 = 133.63096$ | $d_2 = 2.800$ | $n_{d2} = 1.52542$ | $\nu_{d2} = 55.78$ |
| $r_3 = 38.13600$ | $d_3 = 21.000$ | | |
| $r_4 = 101.18667$(Dif. surf.) | $d_4 = 0.000$ | $n_{d3} = 1001$ | $\nu_{d3} = 3.45$ |
| $r_5 = 101.19986$ | $d_5 = 8.100$ | $n_{d4} = 1.52542$ | $\nu_{d4} = 55.78$ |
| $r_6 = -203.54400$ | $d_6 = 5.000$ | | |
| $r_7 =$ (Master lens ML 1) | | | |

Aspherical Coefficients

1st surface $K = 0$
$A_4 = 2.94845 \times 10^{-10}$
$A_6 = -2.17110 \times 10^{-13}$
$A_8 = 0$
$A_{10} = 0$ 4th surface $K = 0$
$A_4 = -3.61321 \times 10^{-10}$
$A_6 = 9.12805 \times 10^{-13}$
$A_8 = 0$
$A_{10} = 0$ Example 6

$f = 148.91$
$F_{NO} = 5.90$
$f_B = 89.48$
$2\omega = 15.96°$

| | | | |
|---|---|---|---|
| $r_1 = 49.93954$(Dif. surf.) | $d_1 = 0.000$ | $n_{d1} = 1001$ | $\nu_{d1} = -3.45$ |
| $r_2 = 49.94160$ | $d_2 = 12.000$ | $n_{d2} = 1.51633$ | $\nu_{d2} = 64.14$ |
| $r_3 = -160.51100$ | $d_3 = 13.200$ | | |
| $r_4 = -69.59669$(Dif. surf.) | $d_4 = 0.000$ | $n_{d3} = 1001$ | $\nu_{d3} = -3.45$ |
| $r_5 = -69.60258$ | $d_5 = 2.500$ | $n_{d4} = 1.51633$ | $\nu_{d4} = 64.14$ |
| $r_6 = 46.97700$ | $d_6 = 5.000$ | | |
| $r_7 =$ (Master lens ML 2) | | | |

Aspherical Coefficients

1st surface $K = 0$
$A_4 = 1.01360 \times 10^{-10}$
$A_6 = -7.97915 \times 10^{-14}$
$A_8 = -8.89760 \times 10^{-17}$
$A_{10} = 0$ 4th surface $K = 0$
$A_4 = -8.17487 \times 10^{-11}$
$A_6 = -1.61210 \times 10^{-12}$
$A_8 = 1.00196 \times 10^{-14}$
$A_{10} = 0$ Example 7

$f = 23.19$
$F_{NO} = 4.60$
$f_B = 38.84$
$2\omega = 89.07°$

| | | | |
|---|---|---|---|
| $r_1 = 57.68300$ | $d_1 = 2.800$ | $n_{d1} = 1.51633$ | $\nu_{d1} = 64.14$ |
| $r_2 = 34.66500$ | $d_2 = 15.000$ | | |
| $r_3 = 114.88169$(Dif. surf.) | $d_3 = 0.000$ | $n_{d2} = 1001$ | $\nu_{d2} = -3.45$ |
| $r_4 = 114.86714$ | $d_4 = 2.800$ | $n_{d3} = 1.52542$ | $\nu_{d3} = 55.78$ |
| $r_5 = 37.36600$(Aspheric) | $d_5 = 10.000$ | | |
| $r_6 = 43.36718$(Dif. surf.) | $d_6 = 0.000$ | $n_{d4} = 1001$ | $\nu_{d4} = -3.45$ |
| $r_7 = 43.36879$ | $d_7 = 13.000$ | $n_{d5} = 1.52542$ | $\nu_{d5} = 55.78$ |

-continued $r_8 = -675.71800(\text{Aspheric})$  $d_8 = 2.000$
$r_9 = (\text{Master lens ML 2})$ Aspherical Coefficients 3rd surface $K = 0$
$A_4 = 1.88749 \times 10^{-10}$
$A_6 = -2.00330 \times 10^{-13}$
$A_8 = 0$
$A_{10} = 0$ 5th surface $K = 0$
$A_4 = -1.64493 \times 10^{-6}$
$A_6 = -1.08718 \times 10^{-10}$
$A_{10} = 0$ 6th surface $K = 0$
$A_4 = -3.02474 \times 10^{-10}$
$A_6 = 7.24058 \times 10^{-13}$
$A_8 = 0$
$A_{10} = 0$ 8th surface $K = 0$
$A_4 = -1.78937 \times 10^{-6}$
$A_6 = -1.57904 \times 10^{-9}$
$A_8 = 0$
$A_{10} = 0$ It is here to be noted that all the values of the 12th aspherical coefficient in master lens ML1 and Examples 1 to 7 are $A_{12}=0$.

Figure 15:
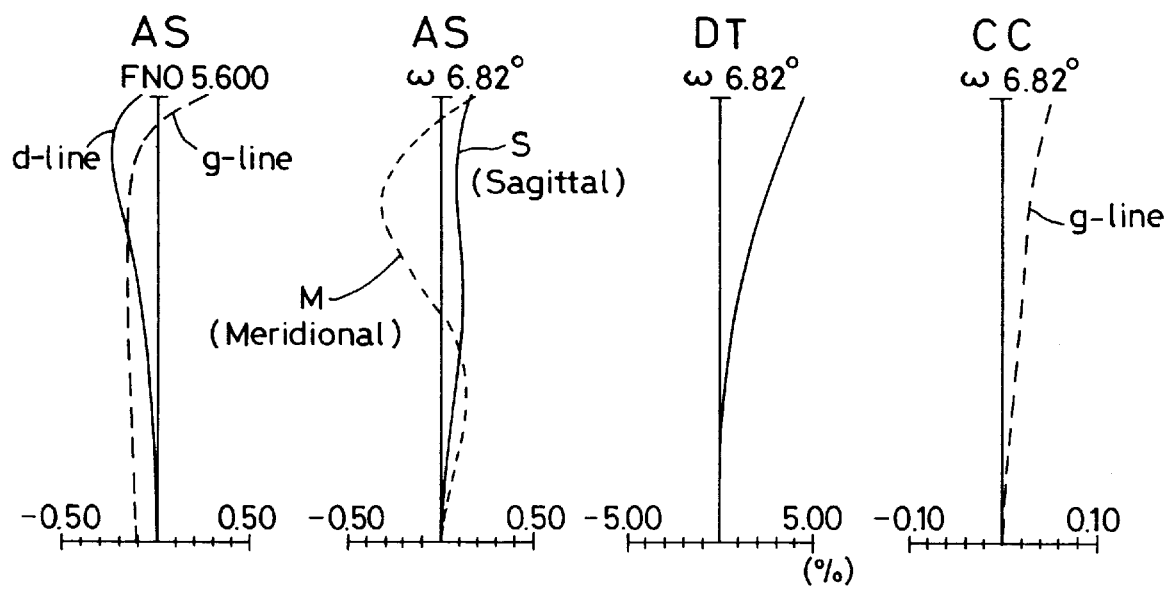
FIG. 15 is an aberration diagram when Example 1 of the front converter lens system of the invention is mounted on the first master lens system.

FIG. 15 is an aberration diagram of Example 1 of converter lens CL mounted on the subject-side of master lens ML1 at a telephoto end position, with SA, AS, DT and CC representing aspherical aberration, astigmatism, distortion and chromatic aberration of magnification, respectively.

Enumerated below are values concerning conditions (1) to (4) in Examples 1 to 7. In what follows, G1FL stands for the focal length of the first lens group in the converter lens optical system, G2FL the focal length of the second lens group in the converter lens optical system, $Y_{max}$ the maximum lens diameter, and Y (ratio) is the ratio of calculated diameter to $Y_{max}$.

EXAMPLE 1

| G1 FL = 70.118 $Y_{max}$ = 25 $\nu_d$ = 55.78 | | | |
| G2 FL = -50.467 $Y_{max}$ = 20 | | | |
| $\phi_{DOE}/\phi$ | | | |
| Y(ratio) | 1st Dif. surf. | 2nd Dif. surf. | $\phi_{DOE\,(1)}/\phi_{DOE\,(2)}$ |
| --- | --- | --- | --- |
| 0.0 | 0.0658 | 0.0665 | -0.712 |
| 0.1 | 0.0656 | 0.0660 | -0.715 |
| 0.2 | 0.0653 | 0.0650 | -0.723 |
| 0.3 | 0.0649 | 0.0637 | -0.733 |
| 0.4 | 0.0648 | 0.0628 | -0.743 |
| 0.5 | 0.0652 | 0.0626 | -0.750 |
| 0.6 | 0.0663 | 0.0629 | -0.758 |
| 0.7 | 0.0679 | 0.0630 | -0.775 |
| 0.8 | 0.0696 | 0.0616 | -0.813 |
| 0.9 | 0.0707 | 0.0576 | -0.883 |
| 1.0 | 0.0702 | 0.0512 | -0.988 |

EXAMPLE 2

| G1 FL = 67.884 $Y_{max}$ = 25 $\nu_d$ = 55.78 | | | |
| G2 FL = -48.860 $Y_{max}$ = 20 | | | |
| $\phi_{DOE}/\phi$ | | | |
| Y(ratio) | 1st Dif. surf. | 2nd Dif. surf. | $\phi_{DOE\,(1)}/\phi_{DOE\,(2)}$ |
| --- | --- | --- | --- |
| 0.0 | 0.0318 | 0.0184 | -1.245 |
| 0.1 | 0.0324 | 0.0194 | -1.201 |
| 0.2 | 0.0342 | 0.0224 | -1.096 |
| 0.3 | 0.0370 | 0.0272 | -0.978 |
| 0.4 | 0.0408 | 0.0336 | -0.874 |
| 0.5 | 0.0457 | 0.0418 | -0.786 |
| 0.6 | 0.0516 | 0.0523 | -0.710 |
| 0.7 | 0.0588 | 0.0660 | -0.642 |
| 0.8 | 0.0674 | 0.0835 | -0.581 |
| 0.9 | 0.0773 | 0.1045 | -0.532 |
| 1.0 | 0.0884 | 0.1253 | -0.508 |

EXAMPLE 3

| G1 FL = 69.395 $Y_{max}$ = 25 $\nu_d$ = 55.78 | | | |
| G2 FL = -49.814 $Y_{max}$ = 20 | | | |
| $\phi_{DOE}/\phi$ | | | |
| Y(ratio) | 1st Dif. surf. | 2nd Dif. surf. | $\phi_{DOE\,(1)}/\phi_{DOE\,(2)}$ |
| --- | --- | --- | --- |
| 0.0 | 0.0819 | 0.0718 | -0.819 |
| 0.1 | 0.0818 | 0.0721 | -0.815 |
| 0.2 | 0.0813 | 0.0727 | -0.803 |
| 0.3 | 0.0806 | 0.0737 | -0.786 |
| 0.4 | 0.0795 | 0.0746 | -0.765 |
| 0.5 | 0.0781 | 0.0759 | -0.739 |
| 0.6 | 0.0764 | 0.0781 | -0.702 |

-continued

G1 FL = 69.395 $Y_{max}$ = 25 $\nu_d$ = 55.78
G2 FL = −49.814 $Y_{max}$ = 20

$\phi_{DOE}/\phi$

| Y(ratio) | 1st Dif. surf. | 2nd Dif. surf. | $\phi_{DOE\,(1)}/\phi_{DOE\,(2)}$ |
|---|---|---|---|
| 0.7 | 0.0745 | 0.0827 | −0.647 |
| 0.8 | 0.0727 | 0.0920 | −0.567 |
| 0.9 | 0.0716 | 0.1089 | −0.472 |
| 1.0 | 0.0722 | 0.1363 | −0.380 |

EXAMPLE 4

G1 FL = 98.103 $Y_{max}$ = 25 $\Psi_d$ = 77.34
G2 FL = −70.607 $Y_{max}$ = 20

$\phi_{DOE}/\phi$

| Y(ratio) | 1st Dif. surf. | 2nd Dif. surf. | $\phi_{DOE\,(1)}/\phi_{DOE\,(2)}$ |
|---|---|---|---|
| 0.0 | 0.1032 | 0.0969 | −0.767 |
| 0.1 | 0.1033 | 0.0984 | −0.756 |
| 0.2 | 0.1036 | 0.1023 | −0.729 |
| 0.3 | 0.1038 | 0.1065 | −0.701 |
| 0.4 | 0.1035 | 0.1090 | −0.683 |
| 0.5 | 0.1028 | 0.1088 | −0.680 |
| 0.6 | 0.1020 | 0.1072 | −0.685 |
| 0.7 | 0.1019 | 0.1081 | −0.678 |
| 0.8 | 0.1039 | 0.1167 | −0.641 |
| 0.9 | 0.1092 | 0.1349 | −0.583 |
| 1.0 | 0.1178 | 0.1528 | −0.555 |

EXAMPLE 5

G1 FL = −88.869 $Y_{max}$ = 35.3 $\nu_d$ = 55.78
G2 FL = 111.451 $Y_{max}$ = 25

$\phi_{DOE}/\phi$

| Y(ratio) | 1st Dif. surf. | 2nd Dif. surf. | $\phi_{DOE\,(1)}/\phi_{DOE\,(2)}$ |
|---|---|---|---|
| 0.0 | 0.1306 | 0.1436 | −1.141 |
| 0.1 | 0.1293 | 0.1426 | −1.137 |
| 0.2 | 0.1256 | 0.1399 | −1.126 |
| 0.3 | 0.1204 | 0.1365 | −1.106 |
| 0.4 | 0.1145 | 0.1337 | −1.074 |
| 0.5 | 0.1097 | 0.1335 | −1.030 |
| 0.6 | 0.1077 | 0.1384 | −0.976 |
| 0.7 | 0.1108 | 0.1511 | −0.919 |
| 0.8 | 0.1213 | 0.1749 | −0.870 |
| 0.9 | 0.1417 | 0.2130 | −0.834 |
| 1.0 | 0.1747 | 0.2689 | −0.815 |

EXAMPLE 6

G1 FL = 70.936 $Y_{max}$ = 20 $\nu_d$ = 64.14
G2 FL = −50.552 $Y_{max}$ = 13

$\phi_{DOE}/\phi$

| Y(ratio) | 1st Dif. surf. | 2nd Dif. surf. | $\phi_{DOE\,(1)}/\phi_{DOE\,(2)}$ |
|---|---|---|---|
| 0.0 | 0.0586 | 0.0615 | −0.679 |
| 0.1 | 0.0587 | 0.0615 | −0.680 |
| 0.2 | 0.0590 | 0.0616 | −0.683 |
| 0.3 | 0.0596 | 0.0618 | −0.687 |
| 0.4 | 0.0602 | 0.0622 | −0.690 |
| 0.5 | 0.0609 | 0.0627 | −0.692 |
| 0.6 | 0.0616 | 0.0633 | −0.693 |
| 0.7 | 0.0621 | 0.0638 | −0.693 |
| 0.8 | 0.0622 | 0.0638 | −0.696 |
| 0.9 | 0.0619 | 0.0625 | −0.706 |
| 1.0 | 0.0608 | 0.0588 | −0.736 |

EXAMPLE 7

G1 FL = −58.587 $Y_{max}$ = 32 $\Psi_d$ = 66.47
G2 FL = 73.191 $Y_{max}$ = 27

$\phi_{DOE}/\phi$

| Y(ratio) | 1st Dif. surf. | 2nd Dif. surf. | $\phi_{DOE\,(1)}/\phi_{DOE\,(2)}$ |
|---|---|---|---|
| 0.0 | 0.0646 | 0.0627 | −1.288 |
| 0.1 | 0.0642 | 0.0620 | −1.292 |
| 0.2 | 0.0629 | 0.0604 | −1.301 |
| 0.3 | 0.0612 | 0.0584 | −1.307 |
| 0.4 | 0.0593 | 0.0572 | −1.296 |
| 0.5 | 0.0581 | 0.0579 | −1.254 |
| 0.6 | 0.0581 | 0.0616 | −1.179 |
| 0.7 | 0.0604 | 0.0692 | −1.091 |
| 0.8 | 0.0658 | 0.0808 | −1.016 |
| 0.9 | 0.0753 | 0.0959 | −0.980 |
| 1.0 | 0.0899 | 0.1127 | −0.996 |

As can be understood from the foregoing explanation, the present invention can provide a high-performance, inexpensive yet lightweight front converter system using a diffractive surface. Especially by use of a resinous material, it is possible to provide an even cheaper yet even more lightweight converter lens system.

What we claim is:

1. A front converter lens system comprising a diffractive surface and mounted on an object side of a master lens system to vary a focal length thereof, said front conversion lens system comprising at least two lens groups, each comprising a diffractive surface, wherein each diffractive surface has a power of the same sign as that of a total power of its respective lens group wherein the diffractive surfaces satisfy the following condition:

$$0.2 < |\phi_{DOE(1)}/\phi_{DOE(2)}| < 1.6 \quad (1)$$

where $\phi_{DOE(1)}$ is a power that the diffractive surface in the first lens group has at a position through which an axial marginal ray having a maximum diameter passes and $\phi_{DOE(2)}$ is a power that the diffractive surface in the second lens group has at a position through which an axial marginal ray having a maximum diameter passes.

2. A front converter lens system comprising a diffractive surface, and mounted on an object side of a master lens system to vary a focal length thereof, said front conversion lens system comprising at least two lens groups, each comprising a diffractive surface, wherein each diffractive surface has a power of the same sign as that of a total power of its respective lens groups satisfying the following condition:

$$0.005 < \phi_{DOE}/\phi < 0.3 \quad (2)$$

where $\phi_{DOE}$ is a power of a diffractive surface, and $\phi$ is a power of a lens group with said diffractive surface used therein.

3. A front converter lens system comprising a diffractive surface, and mounted on an object side of a master lens system to vary a focal length thereof, said front conversion lens system comprising at least two lens groups, each comprising a diffractive surface, that satisfies the following condition:

$$\Psi_d > 50 \quad (4)$$

where $1/\Psi_d = (1/\phi)\Sigma_i(\phi_i/\nu_{di})$ wherein $\phi$ is a power of a lens group having a diffractive surface, $\phi_i$ are powers of the lenses forming said lens group excluding the power of the diffractive surface, and $\nu_{di}$ are Abbe's numbers at a d-line of said lens group including said diffractive optical element.

4. The front converter lens system according to claim 1, 2 or 3, wherein said at least two lens groups have powers of opposite signs.

5. The front converter lens system according to claim 1, 2 or 3 wherein each of said lens groups has an aspherical surface.

6. The front converter lens system according to claim 5, wherein surfaces having said aspherical surface are as many as said diffractive surfaces.

7. The front converter lens system according to claim 6, wherein a substrate material forming each of said diffractive surfaces has an aspherical surface.

8. A front converter lens system according to claim 6, wherein the aspherical surfaces are not the diffractive surfaces.

9. The front converter lens system according to claim 8, wherein said diffractive surfaces are located adjacent to said aspherical surfaces.

10. The front converter lens system according to claim 1, 2 or 3, wherein each of said lens groups comprises one diffractive optical element.

11. The front converter lens system according to claim 10, which comprises a diffractive surface that satisfies the following condition:

$$\nu_d > 50 \quad (3)$$

where $\nu_d$ is a d-line Abbe's number of a substrate material forming a diffractive optical element.

12. The front converter lens system according to claim 3, wherein said diffractive optical element comprises a resinous material.

13. The front converter lens system according to claim 12, wherein said diffractive optical element comprises an acrylic resin.

14. The front converter lens system according to claim 12, wherein said diffractive optical element comprises a resinous material of low hygroscopicity.

15. The front converter lens system according to claim 14, wherein said diffractive optical element comprises a polyolefinic resin.

* * * * *